Feb. 9, 1926. 1,572,041

J. F. ROGERS

GAS PRODUCER

Original Filed Nov. 12, 1921 6 Sheets-Sheet 1

Inventor
John F. Rogers
by
Thurston Kwis & Hudson
Attys.

Feb. 9, 1926. 1,572,041

J. F. ROGERS

GAS PRODUCER

Original Filed Nov. 12, 1921 6 Sheets-Sheet 2

Inventor
John F. Rogers
by
Thurston Kwis & Hudson
Attys.

Feb. 9, 1926.

1,572,041

J. F. ROGERS

GAS PRODUCER

Original Filed Nov. 12, 1921

6 Sheets-Sheet 3

Inventor
John F. Rogers
by
Thurston Kwis & Hudson
Attys.

Feb. 9, 1926. 1,572,041

J. F. ROGERS

GAS PRODUCER

Original Filed Nov. 12, 1921 6 Sheets-Sheet 4

Inventor
John F. Rogers
by
Thurston Kwis & Hudson
Attys.

Feb. 9, 1926. 1,572,041

J. F. ROGERS

GAS PRODUCER

Original Filed Nov. 12, 1921 6 Sheets-Sheet 5

Inventor
John F. Rogers
by Thurston Kwis & Hudson
Attys.

Feb. 9, 1926.
J. F. ROGERS
1,572,041
GAS PRODUCER
Original Filed Nov. 12, 1921
6 Sheets-Sheet 6
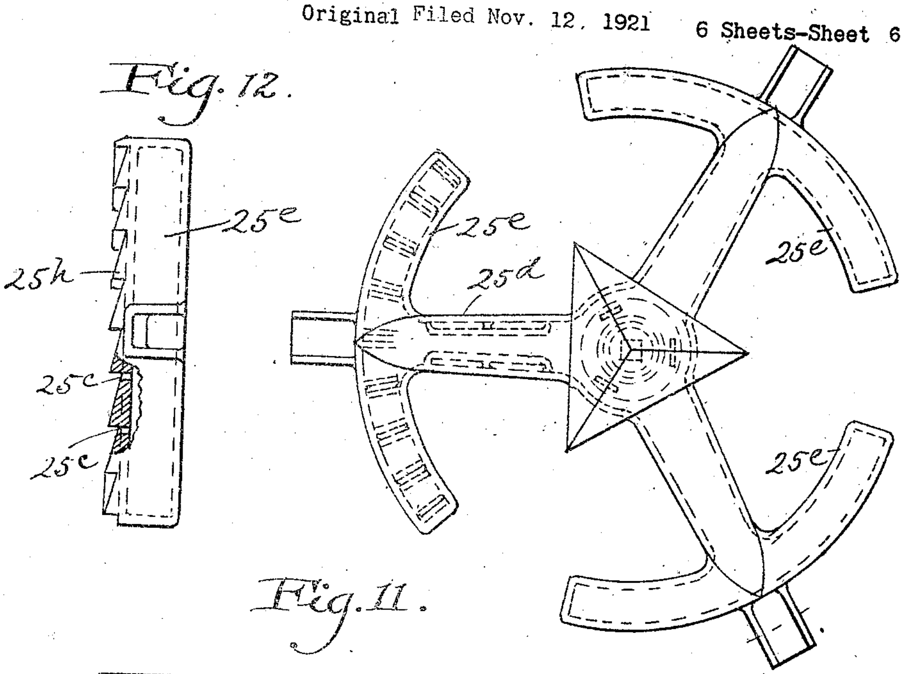
Fig. 12. Fig. 11.
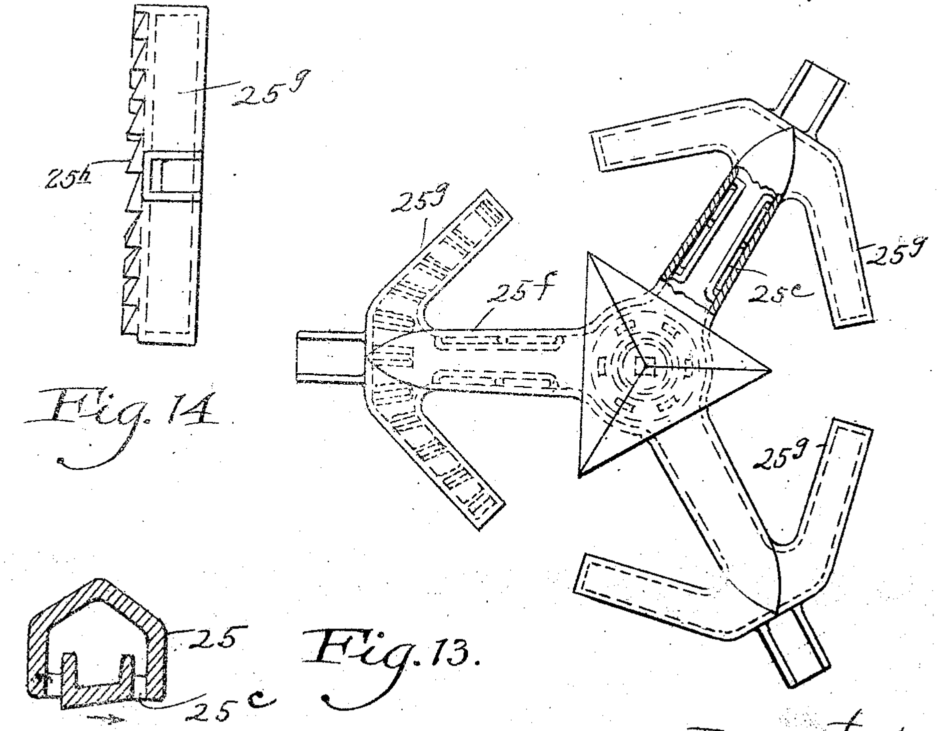
Fig. 14. Fig. 13.
Fig. 15.
Inventor:
John F. Rogers
by
Thurston Kwis & Hudson
Attys.

BEST AVAILABLE COPY

Patented Feb. 9, 1926. 1,572,041

UNITED STATES PATENT OFFICE.

JOHN F. ROGERS, OF CLEVELAND HEIGHTS, OHIO, ASSIGNOR TO THE WELLMAN-SEAVER-MORGAN COMPANY, OF CLEVELAND, OHIO, A CORPORATION OF OHIO.

GAS PRODUCER.

Application filed November 12, 1921, Serial No. 514,521. Renewed March 31, 1924.

*To all whom it may concern:*

Be it known that I, John F. Rogers, a citizen of the United States, residing at Cleveland Heights, in the county of Cuyahoga and State of Ohio, have invented a certain new and useful Improvement in Gas Producers, of which the following is a full, clear, and exact description.

This invention relates to gas producers, and has for its chief object to improve the efficiency and operation of the producers. More particularly it is the aim of the invention to provide certain improvements especially in the relation of the lower ash support and shell or body of the producer, and in the control of the movements of these parts and of certain parts movable therewith so as to obtain a more effective shearing or grinding of the ashes in the ash zone, and a more effective way of preventing the formation of blow holes in the ashes.

Additionally the invention relates to a novel construction which I have provided so as to produce a tearing and shearing action in the ashes both above and below laterally extending blast arms.

In another aspect the invention relates to certain novel structural arrangements involving the supporting of the producer body and ash pan so that they may rotate together or independently of each other about a common axis, but with the pan supported wholly independently of the producer body so that any slight irregularity in the setting or movement of one part will have no effect on the other part.

The invention may be further briefly summarized as consisting in certain novel details of construction, and combinations and arrangements of parts which will be described in the specification and pointed out in the appended claims.

Figure 1:
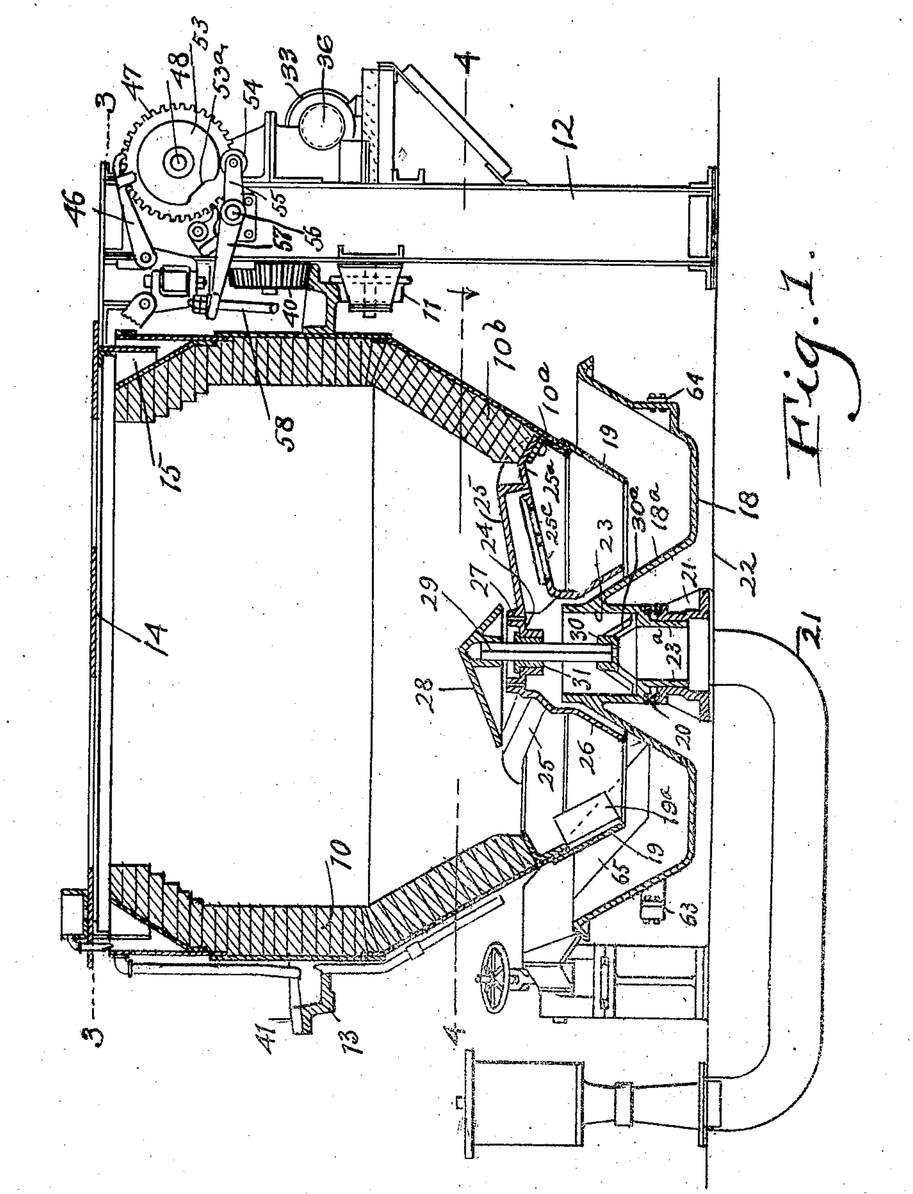
Figure 2:
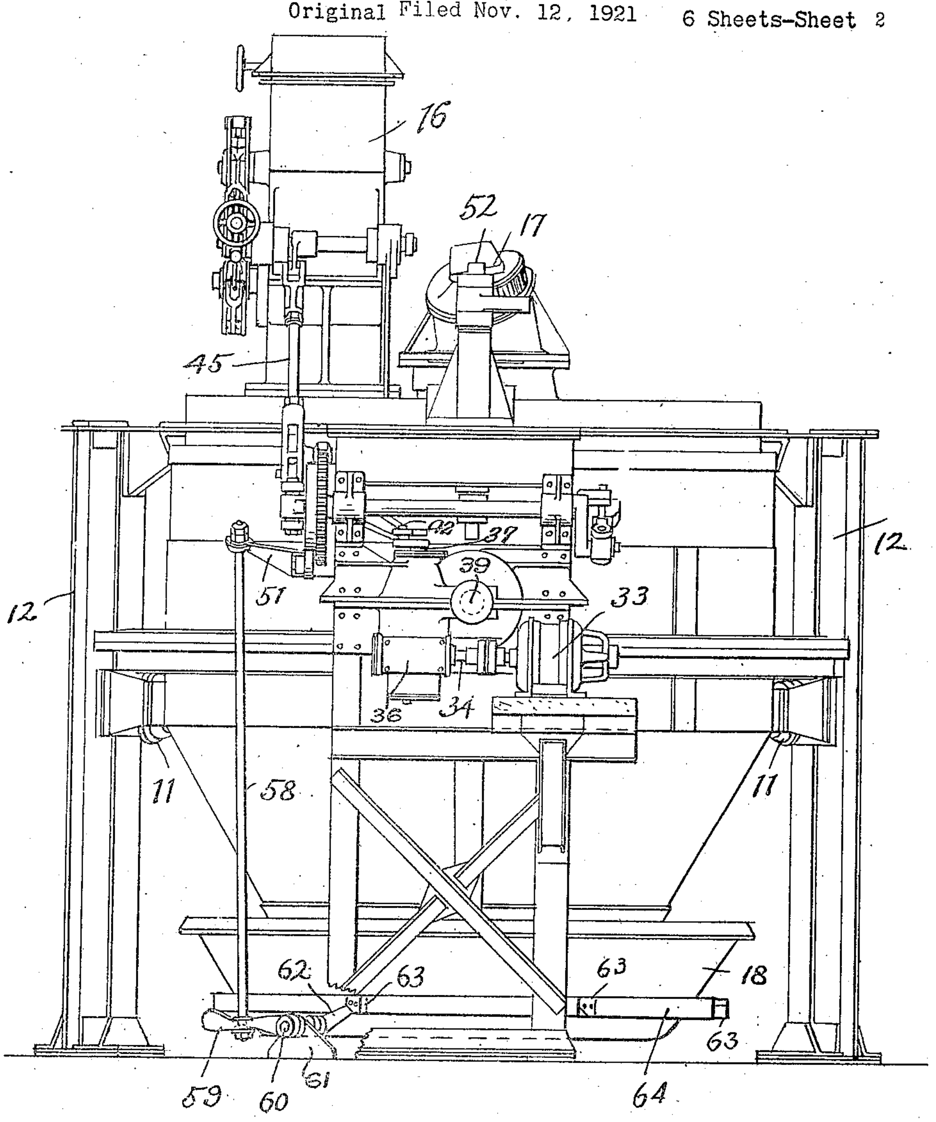
Figures 3, 4:
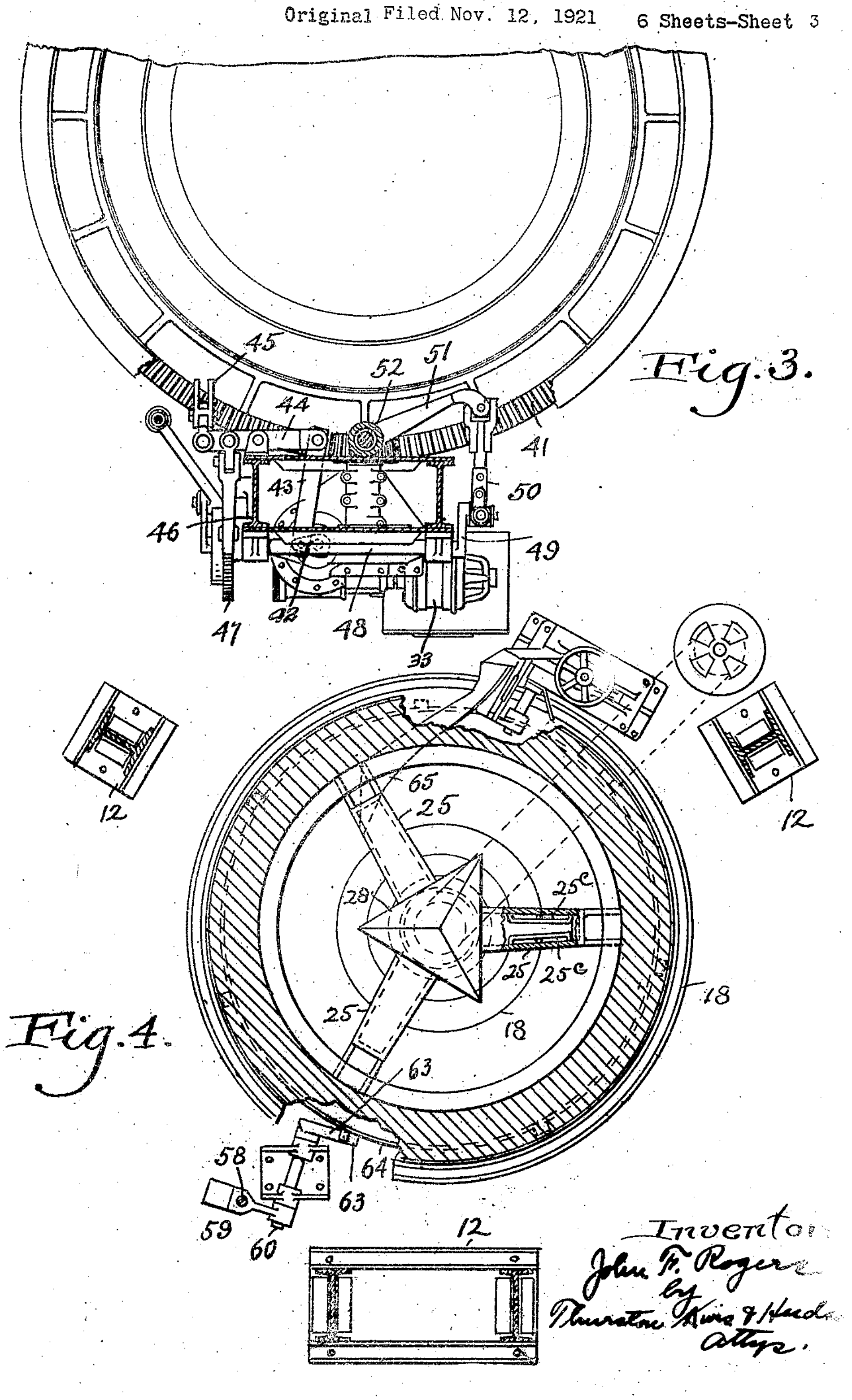
Figures 5, 6:
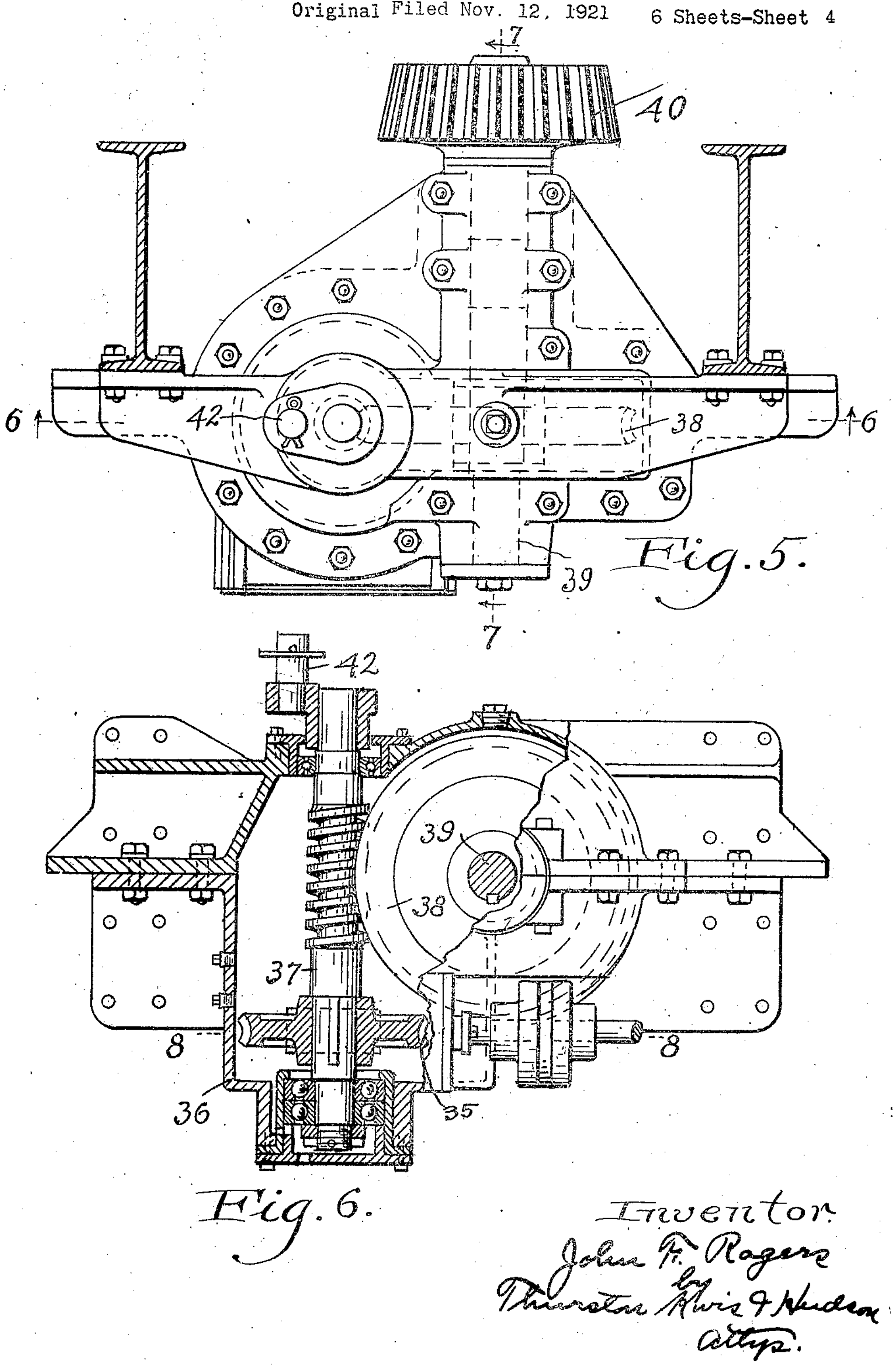
Figure 8:
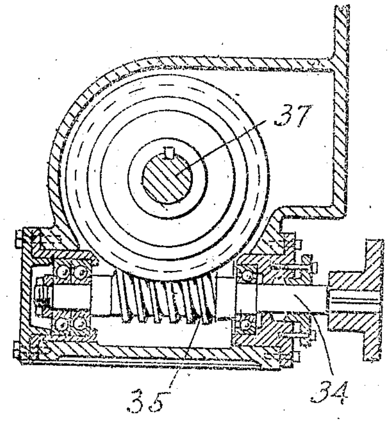
Figure 7:
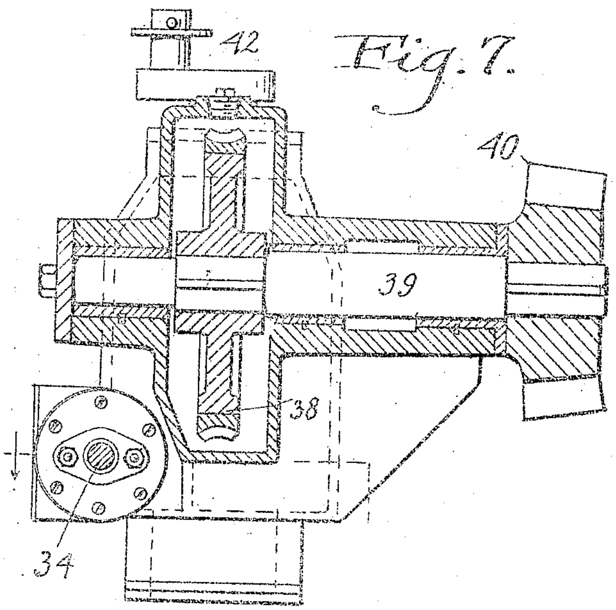
Figure 9:
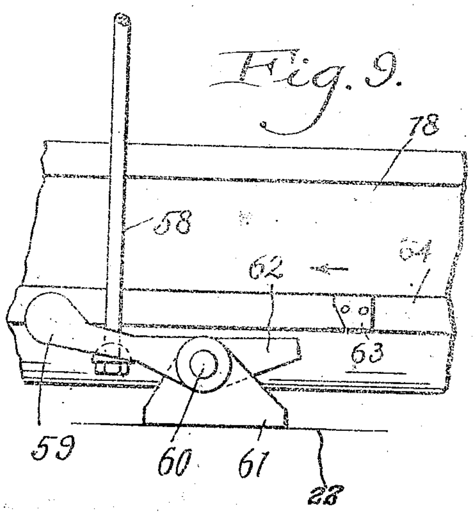
Figure 10:
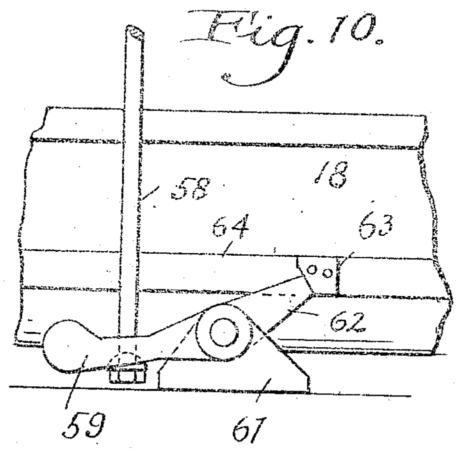

Referring now to the drawings wherein I have shown an embodimment which operates with high efficiency, Fig. 1 is a vertical sectional view of the producer omitting from the top or cover of the producer such parts as are not directly involved in the invention, as the feed mechanism and poker and its operating mechanism; Fig. 2 is a side view of the producer looking toward the operating mechanism; Fig. 3 is a top plan view of a portion of the producer body with parts in section and other parts broken away showing particularly the operating mechanism illustrated in Figs. 1 and 2; Fig. 4 is a top plan view of the ash pan and blast delivery members, but with the producer body removed; Fig. 5 is an enlarged horizontal sectional view through the support for the operating mechanism showing the latter in plan; Fig. 6 is a sectional view substantially along the line 6—6 of Fig. 5; Fig. 7 is a sectional view substantially along the line 7—7 of Fig. 5; Fig. 8 is a detail sectional view substantially along the line 8—8 of Fig. 6; Figs. 9 and 10 are enlarged detail views showing the lower part of the pan stopping mechanism in side elevation, Fig. 9 illustrating the position of the lower stop lever when the pan rotates with the producer body, and Fig. 10 illustrating its position when it is holding the pan stationary; Fig. 11 is a plan view of a modified form of blast delivery spider, the outer portions of the arms of the spider having in this case arc-shaped lateral extensions; Fig. 12 is a view looking toward the outer end of one of the arms and the extensions thereof, as shown in Fig. 11; Figs. 13 and 14 are views similar to Figs. 11 and 12, showing a further modification, the extensions in this case being inclined inwardly in straight lines; and Fig. 15 is a cross-sectional view of one of the arms of Figs. 4, 11 and 13.

Referring now to the drawings, 10 represents the shell or body of the producer, the shell being rotatable, and in this instance being supported on rollers 11 mounted on stationary columns 12 arranged about the producer body, these rollers being engaged by a laterally projecting flange or track 13 secured to the producer body.

At the top is the producer body cover, indicated at 14, the same being connected to the top of the producer body through the medium of a water seal 15, and being stationarily supported on the columns 12. On the top or cover 14 will be mounted such auxiliary apparatus as the feed mechanism which in Fig. 2 is indicated generally by the reference character 16, and the poker mechanism, the top of which is shown at 17 in Fig. 2. However, these parts do not directly enter into or form a part of the present invention, hence they are not and need not be shown in detail.

Rotatably supported beneath the producer body but independently thereof, is an ash pan 18 into which a flange or skirt 19 at the bottom of the shell of the producer body extends to form a water seal. This pan is rotatably supported through the medium of ball bearings 20 at the top of a base 21 stationarily supported on the foundation of the producer, indicated at 22, the pan having at the center a hollow hub portion 23 by which the pan is supported on the base 21 through the medium of the ball bearings 20, and this hub portion having at the bottom a flange 23a which fits down into the base 21 so as to form a continuous passageway through the base and hub for the supply of air to the producer body, an air conduit 21a communicating with the bottom of the base. Preferably the skirt 19 is provided at intervals with internal lugs or flanges 19a which are designed to project into the body of ashes. When the pan and producer body both rotate, these lugs increase the friction produced by the body of ashes and assist in causing the pan and body to rotate in unison. When the pan is held stationary these lugs assist in causing a downward feed of the ashes.

Supported by and rotatable with the lower part of the producer body above the hollow hub 23 of the ash pan is a blast delivery spider comprising a central or hub portion 24, radial arms 25, and a depending flaring skirt 26 which extends downward from the hub or central portion 24 of the spider, around the upper part of the hub 23 of the ash pan and for a distance down along the inner flaring wall 18a of the ash pan. It will be observed from Fig. 1 that there is a clearance between the skirt 26 of the spider and the ash pan so that the pan and spider, and therefore the producer body with which the spider rotates are supported wholly independently of each other as already stated, though arranged for simultaneous and relative rotation about a common vertical axis. An important advantage of this relationship lies in the fact that should there be any inaccuracy of the setting of one rotating part any consequent wobbling action is not communicated to the other part.

The depending skirt 26 extends down into the pan to about the level of the bottom of the outer skirt 19 of the producer body forming a second water seal, the outer skirt 19 flared inwardly and the inner skirt 26 flared outwardly, forming a tapered discharge passageway for the ashes passing downward from above.

The blast delivery spider is supported from the producer body so as to rotate therewith as already stated, and in this instance this is brought about by providing at the outer ends of the spider arms beyond the hollow portions which convey the air, supporting portions in the form of brackets 25a which extend over and rest upon an inwardly extending flange 10a secured to the lower part of the shell of the producer body just above the bottom skirt 19, and on which the lining 10b of the producer body is supported, as shown in Fig. 1.

The air which is supplied through the conduit 21a passes up through the base 21 on which the pan is supported, and through the hub 23 of the pan into the hub or central part of the spider, and from the latter a portion of the air passes outwardly along the spider arms 25 and is delivered from the latter into the ash zone through openings 25a in the lower sides of the arms.

At the same time a portion of the air passes up through the central or hub portion of the spider by openings 27 into a central blast hood 28 the shape and mounting of which constitutes an important part of the present invention, the function of this hood being not only to deliver air into the central part of the ash zone, but to produce a tearing or shearing of the ashes above the spider arms, and to cause a down feed of the ashes at the central part of the producer body, as will be subsequently explained.

It will be observed that the blast hood is pyramidal in shape, having in this instance three sloping sides and a triangular base with outstanding points as shown in Fig. 4, though the number of sloping sides may be greater than three if desired. The intersection of the sloping sides and the point or apex of the pyramid at the top of the hood have a function to be later described.

It is also a feature of the invention that the blast hood 28 is supported from the ash pan instead of from the spider, so that when the ash pan and producer body rotate relatively, there is a relative rotation between the hood and spider. The supporting of the hood from the ash pan is in this instance accomplished by a vertical shaft 29, preferably square in cross-section. The top of the shaft 29 is fitted into a square socket at the center of the blast hood, and its lower end is fitted into a square socket at the hub of a small supporting spider 30 which is inside the hollow hub of the ash pan and rotates therewith. Preferably the spider 30 is not an integral part of the hub of the ash pan, but is a separate member, the legs 30a of the spider 30 branching outward and supported on an internal shoulder in the hub above the flange 23a. The fitting of the legs 30a of the spider to the hub of the ash pan is such that while the spider is constrained to rotate with the pan, it may have a slight rocking movement to accommodate any slight wobbling action which may take place between the ash pan and producer body.

The intermediate portion of the square shaft 29, that is, the portion between the upper and lower ends is fitted into a square opening of an oilless bearing member in the form of a sleeve 31 which is capable of rotating in the upper central part of the blast hood. Obviously with this arrangement the hood and spider will rotate together when the ash pan and producer body rotate together, and the hood and spider will have a relative rotation when the ash pan and producer body are relatively rotated.

As shown in Figs. 1 and 4 the blast arms simply extend out to the producer body, and the blast is delivered into the ash zone through the major portion of the straight sections of the arms. It may be desirable, however, that the arms be provided with lateral blast delivery extensions adjacent the shell or body of the producer, as shown in Figs. 11 and 13. In Fig. 11 the blast arms are designated $25^d$, with arc shaped delivery extension $25^e$, and in Fig. 13 wherein the blast arms are designated $25^f$ the outer portions of the arms are provided with straight inwardly directed delivery extensions $25^g$. It will be understood that the air will pass outwardly along the arms $25^d$ and $25^f$ and laterally along the delivery extensions, and that the arms and extensions are both provided preferably at the bottom with openings for the delivery of the air into the ash zone.

When the arms are provided with lateral extensions such as shown in Figs. 11 and 13, the lower sides of the extensions are preferably provided with a saw tooth form indicated in Figs. 12 and 14 by the reference character $25^h$ in which event the openings for the delivery of air are located immediately behind the shoulders formed by the teeth so that as the extensions of the arms cut or slide through the ashes there will be more or less clear spaces behind the teeth for the outflow of air. The chief function of the tapered teeth on the lower sides of the arm extensions is to force the ashes downward when the pan is stationary and the arms are forced through the ashes. For the same reason the lower sides of the arms proper, whether or not they are provided with the delivery sections, are preferably tapered as shown in Fig. 15 so as to have a downward wedging action when the arms rotate through the ashes.

The spider of the air delivery means may be further modified by having the arms communicate with and deliver air into an annular blast ring carried by the producer body substantially as shown in my prior application, Serial No. 268,293, filed December 26, 1918.

Taking up next that important feature of my invention which brings about a shearing and twisting of the ashes in the lower part of the producer body or between the producer body and the ash pan, it was heretofore stated that the producer body and ash pan are at times rotated together and at intervals are caused to rotate relatively. In causing the producer body and ash pan to rotate together it is preferable that one of these parts only be positively driven, and that the other part be rotated by friction created by the body of ashes extending between the producer body and ash pan. As far as my invention in its broadest aspects is concerned, it is immaterial whether the producer body or pan is positively driven, but I prefer that the positive driving means be applied to the producer body and that it be positively and continuously rotated, and that the ash pan be rotated by the friction of the ashes at the same speed as the producer body, except when the parts are designed to be relatively rotated. To produce the relative rotation I provide means whereby at intervals preferably for a fraction of each revolution the part which is not positively driven be held stationary and then released so as to again move forwardly at the speed of the positively driven part. The mechanism for accomplishing these results will now be described.

On one of the stationary columns 12 a motor 33 is provided, (see particularly Fig. 2) which through the mechanism here shown, is preferably utilized to cause the rotation of the producer body and ash pan, except at intervals when the latter is held stationary by a part of the mechanism to be described, and also preferably operates the mechanical feed mechanism which may be provided on the cover of the producer to feed the fuel thereto, and the poker which may likewise be supported by the cover to swing or oscillate. However, as far as the present invention is concerned, it is immaterial whether the described mechanism performs all of these functions, and therefore the mechanism may be other than here shown.

In the specific mechanism shown, the motor 33 is coupled to a shaft 34 which, through worm and worm wheel gearing 35 enclosed in a housing 36, rotates a vertical shaft 37 which, through worm and worm wheel gearing 38, drives a horizontal shaft 39 which is in a plane above and at right angles to the motor shaft and shaft 34. This shaft 39 is provided at its inner end with a gear 40 adapted to continuously rotate the producer body at the desired slow speed, this gear 40 engaging an annular rack 41 carried by the producer body, and in this instance formed on the top of the annular track 13 which rests and travels on the supporting rollers 11.

It will be observed by reference to Figs. 2 and 3, that at the top of the vertical shaft 37 is a crank having a rotating offcenter crank-pin 42. This crank-pin is connected by a link 43 (see Fig. [illegible]) to a rocking lever 44 which has a twofold function. This lever has connected to it a [illegible] which extends up to and operates the feed mechanism 16 already briefly referred to and shown as a unit in Fig. 2. Likewise this lever 44 actuates a pawl 45 which at each forward stroke turns a ratchet wheel 47 which is mounted on a shaft 48 which likewise performs two functions. At one end of this shaft 48 is a crank 49 to which is connected a link 50 which oscillates or swings back and forth an arm 51 on a shaft 52 which by mechanism not here shown is designed to oscillate the poker, also briefly referred to, and the top of which is illustrated in Fig. 2.

The other function of this shaft 48 is to periodically stop the rotation of the ash pan as it is dragged around by the friction of the ashes. For this purpose the shaft 48 is provided at one end with a cam 53 (see particularly Fig. 1) the periphery of which is engaged by a roller 54 carried by a lever 55 pivoted at 56 on the machinery column 12 and having an outstanding arm 57 to which is connected the upper part of a rod 58 extending down to the lower part of the producer. At its lower end the rod 58 is loosely connected to an arm 59 on a shaft 60 pivoted in a bracket 61 on the foundation 11. This arm is provided at its inner end with an arm in the nature of a pawl 62 adapted to swing up and engage stop lugs 63, any desired number of which are adapted to be provided on the ash pan 15. These lugs may be cast integral with the ash pan but in this instance they are secured to a ring or band 64 which encircles the lower part of the ash pan and is secured thereto.

Obviously, when the ash pan is rotating in the direction indicated by the arrow in Fig. 9, and when the pawl or lever arm 62 is in the position shown in this figure, the ash pan will rotate with the producer body, but when the pawl or lever arm 62 is swung to the position shown in Fig. 10, it will engage one of the stop lugs 63 and hold the pan stationary until the pawl or lever is again rocked downward out of engagement with the lug, whereupon the rotation of the producer body continues. Thus it will be seen that the cam 53 is slowly turned, in this instance with a step by step movement by the action of the pawl 45 on the ratchet 47, and that as long as the roller 54 engages the circular part of the cam the ash pan will rotate with the producer body, for the reason that the rod 58 will then be elevated, holding the pawl or stop arm 62 out of the path of the stop lugs 63 on the pan. When, however, the cam reaches a position such that the roller [illegible] the depressed $53^a$ of the cam, [illegible] arms 57 and 59 is rocked and the rod 58 drops by gravity, allowing the arm 59 at the bottom of the rod to drop by gravity and elevate the pawl or stop arm 62 to the position shown in Fig. 10. The pan will then stay stationary while the producer is rotating through a portion of a revolution to give the best results, and when the roller rides out of the depressed part of the cam the ash pan is released and permitted to continue its rotation with the producer body.

Preferably the ash pan is stopped at intervals such that they average a little over two stops per revolution of the producer body, and such that there is approximately a stopping of the pan for about 27° of each revolution of the producer body. This I find gives very good results in production of the desired shearing action in the ashes, though I wish it to be understood that the number of times that the ash pan is stopped for each revolution of the producer body and the total degrees of retardation of the ash pan per revolution may be varied. This variation can be very readily brought about by varying the number of stop plugs 63 on the pan, or by varying the contour of the cam $53^a$, so as to shorten or lengthen the depressed part of the cam.

Though the stop lever or pawl 62 is elevated at regular intervals and stays elevated for a predetermined period of time, and though the total stoppage of the pan is the same for each revolution of the producer body, and is of predetermined extent or duration, nevertheless, it is not essential that the individual periods of stoppage be all of the same length. In selecting the number of stop lugs on the pan it may be that one of the stop lugs of the pan engages the end of the stop pawl or lever always upon the elapse of a given or certain time after the elevation of the stop pawl. In such event the pan will always be held stationary for the same period. On the other hand, the number, and therefore, spacing of the stop lugs on the pan may be so selected that when the stop pawl is elevated it is nearer to or farther from the approaching stop lug of the pan than when it is elevated the following time. In such event the two succeeding stops or retardations of the pan will be of different durations. Nevertheless, the sum of the individual periods that the pan is held stationary for each revolution of the producer body will always be the same, and that is, the important characteristic or condition to be obtained to produce the desired shearing action and downward feed of the ashes.

The effect of the relatively rotatable parts in the lower part of the producer on the [illegible] is as follows:

When the producer body and ash pan rotate in unison, there is no relative movement between the ashes and these parts including the blast arms and hood, but when the rotation of the ash pan is stopped, inasmuch as the blast arms rotate through the ashes, there is a shearing action in the body of ashes in the plane of the arms and beneath the same, the effect of which is to prevent the formation of blow holes. At the same time, since the hood rotates with the pan and stops with the pan, when the pan is stopped the blast hood is held stationary, and hence there is a shearing action in the ashes due to the relative rotation between the blast hood and blast arm, this shearing action being renderd effective by the pyramidal or irregular shape of the hood. At the same time, since the body of ashes above the hood is rotating while the hood is held stationary, and since the hood has the pyramidal form with its intersecting flat faces and sharp apex, the head has a boring action in the ashes, the effect of which is similar to that of a drill or reamer producing a downward movement of the ashes at the central part of the producer, or above the hood, this taking place while the ashes are fed downward between the depending skirts of the producer body and spider, this downward feed being enhanced by the action of the lugs or blades 19ª projecting inwardly from the skirt of the producer body. In consequence the fuel bed is maintained substantially level by the uniform downward feed of the ashes across the entire section of the ash zone. The ashes may be removed from the ash pan when desired, by any suitable form of plow which is here designated as a whole by the reference character 65.

The effective shearing action both above and below the spider or blast arms, and the reaming action just explained between the body of ashes and hood, these actions being caused to occur automatically at intervals by producing a definite or predetermined total stoppage of the pan for each revolution of the producer body, result in a greatly increased efficiency of the producer as a whole.

I do not desire to be confined to the details of construction and arrangement herein shown, but aim in my claims to cover all modifications which do not involve a departure from the spirit and scope of the invention as defined in the appended claims.

Having described my invention, I claim:

1. In a gas producer, a rotatable producer body and a rotatable ash pan, means whereby the body and pan are caused to rotate, and means for automatically holding one of the parts against rotation at definite intervals.

2. In a gas producer, a rotatable producer body and a rotatable ash pan, means for positively rotating one of said parts thereby causing the other part to rotate with it by the friction of the ashes, and means acting automatically and at definite intervals to hold the friction driven part against rotation.

3. In a gas producer, a rotatable producer body and a rotatable ash pan, means for rotating the producer body causing the ash pan to be rotated with the body by the friction of the body of ashes, and means for automatically holding the ash pan against rotation at definite intervals.

4. In a gas producer, a rotatable producer body, a rotatable ash pan, mechanism including a source of power for positively rotating one of said parts, the other part being adapted to be driven indirectly by the positively driven part through the friction of the body of ashes, and means controlled by said driving means for stopping the rotation of the frictionally driven part at intervals.

5. In a gas producer, a rotatable producer body, a rotatable ash pan, mechanism for rotating the producer body whereby the ash pan is indirectly driven by the producer body through the friction created by the body of ashes, and means controlled by said mechanism for automatically stopping the rotation of the ash pan at intervals.

6. In a gas producer, a rotatable producer body, a rotatable ash pan, mechanism for rotating one of said parts thereby causing the other part to be rotated through the friction created by the body of ashes, a stop member for holding the friction driven member stationary while the positively driven part continues its rotation, and means whereby said stop member is controlled by said rotating mechanism.

7. In a gas producer, a rotatable producer body, a rotatable ash pan, mechanism for rotating the producer body and for indirectly rotating the ash pan through the friction created by the body of ashes, a stop member for engaging and stopping the rotation of the ash pan at intervals, and means operated by said rotating mechanism for controlling said stop member so as to cause it to function automatically.

8. In a gas producer, a rotatable producer body, an independently rotatable ash pan, blast delivery means including blast arms and a hood at the lower part of the producer body, the blast arms being rotatable with the producer body and the hood being rotatable with the ash pan.

9. In a gas producer, a producer body, an ash pan, both rotatably supported, a blast delivery means including blast delivery arms, and a blast hood above the center of the same, said arms and hood being relatively rotatable.

10. In a gas producer, a producer body, an ash pan beneath the same, a spider having outwardly projecting blast delivery arms arranged at the lower part of the producer body, a blast hood above the center of the spider, means whereby the blast is delivered to the spider and hood through the center of the ash pan, the spider and hood being relatively rotatable.

11. In a gas producer, a producer body, an ash pan beneath the same, a spider having outwardly projecting blast delivery arms arranged at the lower part of the producer body, a blast hood above the center of the spider, means whereby the blast is delivered to the spider and hood through the center of the ash pan, the producer body and pan being relatively rotatable, and one operatively connected to the spider and the other operatively connected to the hood.

12. In a gas producer, a producer body, an ash pan beneath the same, a spider having outwardly projecting blast delivery arms arranged at the lower part of the producer body, a blast hood above the center of the spider, means whereby the blast is delivered to the spider and hood through the center of the ash pan, the producer body and ash pan being relatively rotatable, and the spider rotating with the producer body and the hood with the ash pan.

13. In a gas producer, a producer body, an ash pan beneath the same, blast delivery means at the lower part of the producer body including blast arms and a blast hood, the blast arms and hood being relatively rotatable, said hood having a substantially pyramidal shape with an apex at the top.

14. In a gas producer, a producer body, an ash pan beneath the same, blast delivery means at the lower part of the producer body including blast arms and a blast hood, the producer body and hood being relatively rotatable, said blast hood having a sloping top with intersecting faces terminating in an upper apex.

15. In a gas producer, a producer body, an ash pan, the body and pan being relatively rotatable, blast delivery means including a spider within the lower portion of the producer body, and means for causing a shearing action in the ashes above the arms of the spider, said spider and ash pan being relatively rotatable.

16. In a gas producer, a producer body, an ash pan, said parts being relatively rotatable, blast delivery means including rotatable blast delivery arms at the lower part of the producer body adapted to produce a shearing action in the ashes when the producer body and pan are relatively rotated, and means for producing a shearing action in the ashes above the arms.

17. In a gas producer, a producer body, an ash pan beneath the same, the ash pan and producer body being relatively rotatable, blast delivery means at the lower part of the producer body and including outstanding arms which are adapted to lie in the ash zone, said arms and a section of the ash zone rotating relatively when the producer body and ash pan are relatively rotated, and means immediately above the arms with respect to which the arms have a relative rotation when the body and pan are relatively rotated.

18. In a gas producer, a producer body, an ash pan, said parts being relatively rotatable, a blast delivery spider at the lower part of the producer body and rotatable therewith, said spider having a depending skirt extending into the pan and forming therewith a water seal.

19. In a gas producer, a producer body, an ash pan at the bottom of the same, the producer body and pan being relatively rotatable and the pan having a central hub portion through which a blast is adapted to be supplied, blast delivery means communicating with said central portion of the pan and having a depending skirt extending down into the pan around said central portion thereof and forming a water seal.

20. In a gas producer, a producer body, an ash pan below the producer body, and having a central portion through which a blast is adapted to be delivered, a blast delivery spider communicating with said portion, the producer body having at the bottom a skirt extending into the pan, and the spider having a skirt also extending into the pan and surrounding said central portion of the pan inside the skirt of the producer body.

21. In a gas producer, a producer body, an ash pan below the producer body, and having a central portion through which a blast is adapted to be delivered, a blast delivery spider communicating with said portion, the producer body having at the bottom a skirt extending into the pan, and the spider having a skirt also extending into the pan and surrounding said central portion of the pan inside the skirt of the producer body, the skirt on the producer body tapering inwardly, and the skirt of the spider tapering outwardly.

22. In a gas producer, a producer body, an ash pan at the bottom thereof, said producer body and pan being relatively rotatable, and the pan having a central portion through which a blast is adapted to be delivered, the pan and body being supported substantially coaxially but wholly independently of each other.

23. In a gas producer, a producer body, a pan beneath the same, the producer body and pan being relatively rotatable, blast delivery means rotatable with the producer body and communicating at the center with the central portion of the pan, a hood above said blast delivery means and having a support carried by the central portion of the pan and extending up through said blast delivery means.

24. In a gas producer, a producer body, an ash pan beneath the same, the ash pan and producer body being relatively rotatable, and the pan having a hollow central portion through which a blast may be delivered, a blast delivery hood in the lower part of the producer body, and supporting means extending from the hood into the central part of the pan.

25. In a gas producer, a producer body, an ash pan beneath the same, the body and pan being relatively rotatable, and the pan having a central hollow portion through which a blast may be delivered, a blast delivery spider rotatable with the producer body, a blast hood above the central part of the spider, a supporting shaft carrying said blast hood, said shaft having a bearing in the central part of the spider and having a supporting and driving connection with the central part of the pan.

26. In a gas producer, a rotatable producer body, an ash pan beneath the same, the body and pan being relatively rotatable, a skirt at the lower edge of the producer body extending into said ash pan, said skirt having a flange, extending inwardly from its inner surface into the body of ashes to facilitate the flow of ashes to the ash receptacle during relative rotation of the producer body with respect to the ash pan.

27. In a gas producer, a rotatable producer body and a rotatable ash pan, means whereby the body and pan are caused to rotate, and means acting automatically and periodically to temporarily hold one of the parts against movement.

In testimony whereof, I hereunto affix my signature.

JOHN F. ROGERS.

DISCLAIMER.

1,572,041.—*John F. Rogers*, Cleveland Heights, Ohio. GAS PRODUCER. Patent dated February 9, 1926. Disclaimer filed March 21, 1927, by the assignee, *The Wellman-Seaver-Morgan Company*.

Hereby enters this disclaimer to those portions of the claims attached to said specification which are in the following words, to wit:

"22. In a gas producer, a producer body, an ash pan at the bottom thereof, said producer body and pan being relatively rotatable, and the pan having a central portion through which a blast is adapted to be delivered, the pan and body being supported substantially coaxially but wholly independently of each other.

"24. In a gas producer, a producer body, an ash pan beneath the same, the ash pan and producer body being relatively rotatable, and the pan having a hollow central portion through which a blast may be delivered, a blast delivery hood in the lower part of the producer body, and supporting means extending from the hood into the central part of the pan."

[*Official Gazette April 5, 1927.*]